United States Patent
Nevarez et al.

(10) Patent No.: US 8,534,501 B2
(45) Date of Patent: Sep. 17, 2013

(54) INTEGRATED METHOD AND SYSTEM FOR DISPENSING BEVERAGE INGREDIENTS

(75) Inventors: Roberto Nevarez, Hudson, FL (US); William E. Smith, Land O'Lakes, FL (US); Jan Claesson, Land O'Lakes, FL (US)

(73) Assignee: Enodis Corporation, New Port Richey, FL (US)

( * ) Notice: Subject to any disclaimer, the term of this patent is extended or adjusted under 35 U.S.C. 154(b) by 95 days.

(21) Appl. No.: 12/633,763

(22) Filed: Dec. 8, 2009

(65) Prior Publication Data

US 2010/0314410 A1 Dec. 16, 2010

Related U.S. Application Data

(60) Provisional application No. 61/120,772, filed on Dec. 8, 2008.

(51) Int. Cl.
*B67D 7/74* (2010.01)

(52) U.S. Cl.
USPC .......... 222/129.1; 222/55; 222/105; 222/132; 222/135; 222/144.5; 222/146.6

(58) Field of Classification Search
USPC ............... 222/105, 129.1, 129.3, 129.4, 132, 222/133, 135, 144.5, 145.1, 146.6, 129, 55, 222/61, 64
See application file for complete search history.

(56) References Cited

U.S. PATENT DOCUMENTS

| | | | |
|---|---|---|---|
| 2,008,106 A | 7/1935 | Lawrence | 366/197 |
| 2,653,733 A | 9/1953 | Rudd et al. | 222/145 |
| 2,855,007 A | 10/1958 | Erickson et al. | 99/275 |
| 3,101,872 A | 8/1963 | Dickinson | 222/197 |
| 3,154,123 A | 10/1964 | Tomlinson | 241/101.6 |
| 3,156,103 A | 11/1964 | Ross | 62/331 |
| 3,272,388 A | 9/1966 | Whitmore | |
| 3,295,997 A | 1/1967 | Tomlinson et al. | 241/34 |
| 3,460,716 A | 8/1969 | Thomas | |
| 3,460,717 A | 8/1969 | Thomas | |
| 3,505,075 A | 4/1970 | Black | |
| 3,592,367 A | 7/1971 | Landis et al. | |
| 3,615,673 A | 10/1971 | Black et al. | 99/79 |
| 3,630,045 A | 12/1971 | Lunde | 62/320 |
| 3,704,599 A | 12/1972 | Darby et al. | 62/354 |

(Continued)

FOREIGN PATENT DOCUMENTS

EP 0176259 B1 1/1990
EP 1690481 8/2006

(Continued)

OTHER PUBLICATIONS

International Search Report from the corresponding International Application No. PCT/US2009/067227 dated Feb. 17, 2010.

(Continued)

*Primary Examiner* — J. Casimer Jacyna
(74) *Attorney, Agent, or Firm* — Ohlandt, Greenley, Ruggiero & Perle, L.L.P.

(57) ABSTRACT

An integrated beverage blending system comprising: a controller for menu selection; an ice portion control module; an ingredient module; a dispensing apparatus in communication with the ice portion control module and the ingredient module, wherein the ice and the ingredient are dispensed into a beverage container via the dispensing apparatus.

16 Claims, 20 Drawing Sheets

(56) References Cited

U.S. PATENT DOCUMENTS

| | | | | |
|---|---|---|---|---|
| 3,987,211 | A | 10/1976 | Dunn et al. | 426/551 |
| 4,083,462 | A | 4/1978 | Teske et al. | 214/17 D |
| 4,392,588 | A * | 7/1983 | Scalera | 222/129.4 |
| 4,503,502 | A | 3/1985 | Chapin | |
| 4,531,380 | A | 7/1985 | Hagen | 62/320 |
| 4,590,975 | A | 5/1986 | Credle, Jr. | |
| 4,610,145 | A | 9/1986 | Arzberger et al. | 62/127 |
| 4,638,875 | A | 1/1987 | Murray | 177/1 |
| 4,653,281 | A | 3/1987 | Van der Veer | 62/71 |
| 4,681,030 | A | 7/1987 | Herbert | 99/484 |
| 4,708,487 | A | 11/1987 | Marshall | 366/206 |
| 4,745,773 | A | 5/1988 | Ando | 62/320 |
| 4,790,240 | A | 12/1988 | Henn et al. | 99/282 |
| 4,932,223 | A | 6/1990 | Paul et al. | 62/354 |
| 4,941,593 | A | 7/1990 | Hicks et al. | 222/148 |
| 4,962,866 | A * | 10/1990 | Phillips | 221/8 |
| 5,036,892 | A | 8/1991 | Stembridge et al. | 62/1 |
| 5,067,819 | A | 11/1991 | Heinhold et al. | 366/138 |
| 5,068,116 | A | 11/1991 | Gibney et al. | 426/231 |
| 5,072,853 | A * | 12/1991 | Shannon | 222/1 |
| 5,192,131 | A | 3/1993 | Hatfield | 366/308 |
| 5,208,050 | A | 5/1993 | Ney | 425/202 |
| 5,323,691 | A | 6/1994 | Reese et al. | 99/275 |
| 5,350,082 | A | 9/1994 | Kiriakides et al. | 141/1 |
| 5,439,289 | A | 8/1995 | Neilson | 366/297 |
| 5,549,219 | A | 8/1996 | Lancaster | 221/1 |
| 5,619,901 | A | 4/1997 | Reese et al. | 99/275 |
| 5,653,157 | A | 8/1997 | Miller | |
| 5,683,011 | A | 11/1997 | Miliani | 222/56 |
| 5,698,247 | A | 12/1997 | Hall | 426/64 |
| 5,778,761 | A | 7/1998 | Miller | 99/275 |
| 5,797,519 | A | 8/1998 | Schroeder et al. | |
| 5,803,377 | A | 9/1998 | Farrell | 241/36 |
| 5,833,362 | A | 11/1998 | Shepard | 366/111 |
| 5,839,291 | A | 11/1998 | Chang | 62/126 |
| 5,863,118 | A | 1/1999 | Ackels et al. | 366/129 |
| 5,910,164 | A | 6/1999 | Snelling et al. | 62/344 |
| 5,911,749 | A | 6/1999 | Sugie | 62/354 |
| 5,960,701 | A | 10/1999 | Reese et al. | 99/275 |
| 5,967,367 | A | 10/1999 | Orsborn | 222/30 |
| 6,068,875 | A | 5/2000 | Miller et al. | 426/565 |
| 6,196,712 | B1 | 3/2001 | Elm | 366/197 |
| 6,202,894 | B1 | 3/2001 | Struminski et al. | 222/129.3 |
| 6,269,973 | B1 | 8/2001 | Bennett et al. | 221/1 |
| 6,283,627 | B1 | 9/2001 | Fromm | 366/260 |
| 6,293,691 | B1 | 9/2001 | Rebordosa et al. | 366/129 |
| 6,338,569 | B1 | 1/2002 | McGill | 366/144 |
| 6,490,872 | B1 | 12/2002 | Beck et al. | 62/303 |
| 6,607,096 | B2 | 8/2003 | Glass et al. | 222/100 |
| 6,609,821 | B2 | 8/2003 | Wulf et al. | |
| 6,616,323 | B2 | 9/2003 | McGill | 366/201 |
| 6,684,646 | B2 | 2/2004 | Voute et al. | |
| 6,689,410 | B2 | 2/2004 | Gerber | |
| 6,705,356 | B2 | 3/2004 | Barton et al. | 141/2 |
| 6,722,675 | B2 | 4/2004 | Bidwell | 280/89 |
| 6,730,348 | B2 | 5/2004 | Miller et al. | 426/565 |
| 6,772,675 | B2 | 8/2004 | Ervin | 99/275 |
| 6,889,603 | B2 | 5/2005 | Carhuff et al. | |
| 6,945,157 | B2 | 9/2005 | Brown et al. | |
| 7,038,172 | B1 | 5/2006 | Stuck | |
| D526,170 | S | 8/2006 | Gugni | 7/706 |
| 7,175,046 | B2 | 2/2007 | Yao | 221/265 |
| 7,207,506 | B1 | 4/2007 | Dickson, Jr. et al. | 241/21 |
| 7,237,691 | B2 * | 7/2007 | Danby et al. | 222/103 |
| 7,237,692 | B2 | 7/2007 | Bodum | |
| 7,258,061 | B2 | 8/2007 | Campbell et al. | |
| 7,278,275 | B2 | 10/2007 | Voglewede et al. | 62/320 |
| D555,678 | S | 11/2007 | Broerson et al. | 15/89 |
| 7,325,485 | B2 | 2/2008 | Carhuff et al. | |
| 7,383,966 | B2 | 6/2008 | Ziesel | 222/100 |
| 7,475,795 | B2 | 1/2009 | Faller et al. | |
| 7,543,346 | B2 | 6/2009 | Roh et al. | |
| 7,614,524 | B2 | 11/2009 | Girard et al. | 222/129.4 |
| 7,665,632 | B2 * | 2/2010 | Ziesel | 222/129.1 |
| 8,145,854 | B1 | 3/2012 | Lee | |
| 2002/0194999 | A1 | 12/2002 | Ervin | |
| 2003/0079612 | A1 | 5/2003 | Con | |
| 2003/0193833 | A1 | 10/2003 | Wulf et al. | |
| 2005/0132902 | A1 | 6/2005 | D'Arcangelis et al. | |
| 2005/0183426 | A1 | 8/2005 | Learned | 426/565 |
| 2005/0242120 | A1 | 11/2005 | Sato et al. | 99/290 |
| 2006/0118581 | A1 | 6/2006 | Clark | |
| 2007/0084888 | A1 * | 4/2007 | Santos et al. | 222/631 |
| 2007/0095859 | A1 | 5/2007 | Maser et al. | 222/148 |
| 2007/0205220 | A1 | 9/2007 | Rudick et al. | 222/129.4 |
| 2007/0205221 | A1 | 9/2007 | Carpenter et al. | 222/129.4 |
| 2007/0289991 | A1 | 12/2007 | Jensen | |
| 2008/0089983 | A1 | 4/2008 | Coste | 426/106 |
| 2008/0093382 | A1 | 4/2008 | Sher et al. | 222/129.1 |
| 2008/0279040 | A1 | 11/2008 | Neilson | |
| 2009/0069922 | A1 | 3/2009 | Dattolo et al. | |
| 2010/0082132 | A1 | 4/2010 | Marruchella et al. | |
| 2010/0139493 | A1 | 6/2010 | Nevarez et al. | 99/275 |
| 2010/0145522 | A1 | 6/2010 | Claesson et al. | 700/265 |
| 2010/0318225 | A1 | 12/2010 | Claesson et al. | 700/265 |
| 2010/0323071 | A1 | 12/2010 | Nevarez et al. | 426/231 |
| 2011/0104804 | A1 | 5/2011 | Wood et al. | |

FOREIGN PATENT DOCUMENTS

| | | |
|---|---|---|
| EP | 1 772 081 A1 | 4/2007 |
| JP | 2004326246 A | 11/2004 |
| WO | 02/082959 A2 | 10/2002 |
| WO | 2008/105107 A1 | 9/2008 |

OTHER PUBLICATIONS

Examiner's Form 892 issued Sep. 29, 2011 in related U.S. Appl. No. 12/823,985.
International Preliminary Report on Patentability issued Oct. 26, 2011 in the related PCT/US2009/067229.
Examiner's Form 892 issued for Paper No. 71411 in related Design U.S. Appl. No. 29/351,551.
*International Search Report* mailed Mar. 2, 2009 in the corresponding PCT/US2009/000247.
*Extended European Search Report* mailed Dec. 21, 2010 in the corresponding PCT/US2009/000247.
Examiner's Forms 892 issued Sep. 1, 2010 and Jun. 20, 2011 in the related U.S. Appl. No. 12/009,221.
Russian Patent Office action dated Jan. 25, 2013 from corresponding Russian Patent Application No. 2011128012/08(041554), pp. 7.
Russian Patent Office action dated Feb. 4, 2013 from corresponding Russian Patent Application No. 2011128014/20(041556), pp. 10.
Australian Patent Office action dated Feb. 11, 2013 from corresponding Australian Patent Application No. 2009333466, pp. 5.
Patent Examination Report No. 1 dated Sep. 21, 2012 for corresponding Australian Patent Application No. 2009333465.
English translation of First Office Action dated Aug. 27, 2012 for corresponding Chinese Patent Application No. 200980137971.8.
Extended European Search Report dated Jul. 23, 2012 for corresponding European Patent Application No. 09836740.2.
Extended European Search Report dated Jul. 23, 2012 for corresponding European Patent Application No. 09836743.6.
Extended European Search Report dated Sep. 3, 2012 for European application No. 09832454.4.
Extended European Search Report dated Sep. 3, 2012 for European application No. 09836742.8.
Extended European Search Report dated Sep. 3, 2012 for European application No. 09836741.0.
Chinese Office Action dated Sep. 27, 2012 for Chinese application No. 2009-80137700.2.
Chinese Office Action dated Oct. 23, 2012 for Chinese application No. 200980137874.9.
Chinese Office Action dated Oct. 22, 2012 for Chinese application No. 200980137980.7.
Russian Office Action dated Sep. 21, 2012 for Russian application No. 2011127987.
Australian Examination Report dated Jan. 11, 2013 for Australian patent No. 2009324698.

English Translation of Russian Patent Office action dated Apr. 26, 2013 from corresponding Russian Patent Application No. 2011127986/12(041528), pp. 3.

Canadian Patent Office action dated Jun. 10, 2013 from corresponding Canadian Patent Application No. 2,746,226 pp. 3.

First Office Action dated Jan. 31, 2013 for corresponding Chinese patent application No. 200980138020.2 with English translation, pp. 17.

Canadian Patent Office action dated Apr. 22, 2013 from corresponding Canadian Patent Application No. 2,746,224, pp. 3.

First Office Action dated Dec. 17, 2012 for corresponding Chinese patent application No. 200980137873.4 with English translation, pp. 18.

* cited by examiner

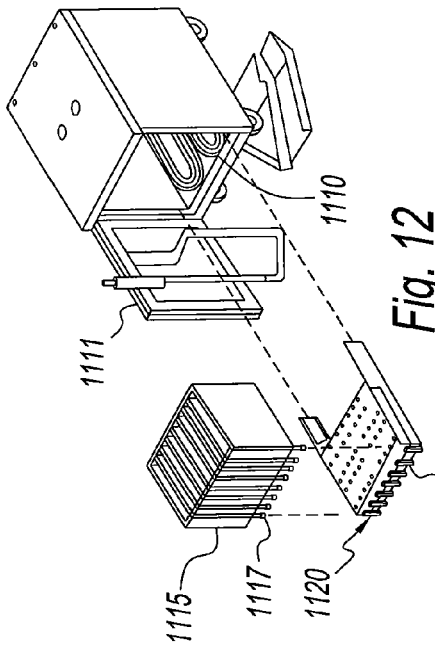
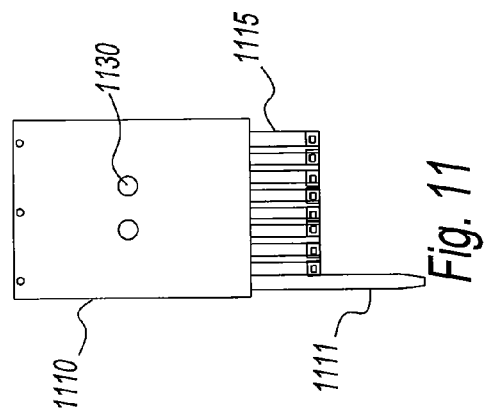
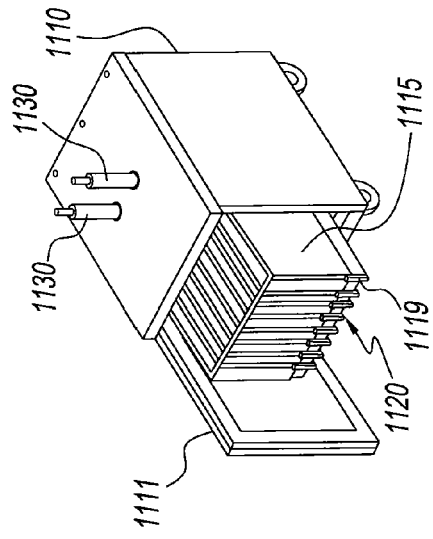
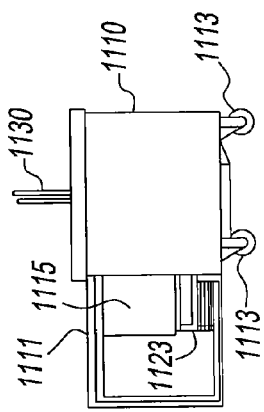
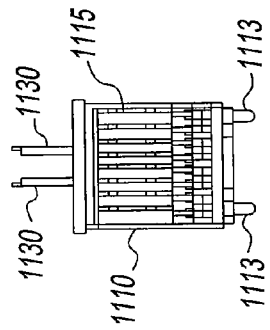

Product Mode

| | Idle - | | |
|---|---|---|---|
| Display/Function | 1. Computer displays "Select Up to 3 Flavors"<br>2. Computer displays up to 7 flavors (configurable) selections located in line with selection soft key and a "Water Only" and "ICE Only" selection located above the right most bottom soft keys respectively. | | |
| Button | Press 1-3 flavors OR Ice Only soft keys not cannot select both Ice Only and flavors | Press X to go to system setup | Pression more than 3 flavors |
| Display/Function | Display highlights the flavors selected | Display un-highlight selections | Display reverse videos the first 3 and does not change unless the same item is selected in which case will toggle to un-select. |
| Botton | Press check to select | Press X to clear selections | |
| Dixplay/Function | 1. Computer displays "Additives and Cup Size"<br>2. Computer displays "Flavor: sel1, and sel3" below where sel1 - sel3 are the flavors previously selected.<br>3. Computer displays three additives available for selection below the top soft keys including Yogurt on the right top key. Note Computer displays additives crossed out if currently unavailable.<br>4. Computer displays four cup size selections "Small" above the bottom left key, "Medium" above the center bottom key, "Large" and "XLarge" above the bottom right most keys respectively. | — | — |

Fig. 23

| | Product Mode | |
|---|---|---|
| Button | Press X to go to previous Display | 1. Place cup under dispenser<br>2. If additive desired 1st select up to three additives<br>3. Press soft key under Small, Medium, Large, or XLarge - this starts the dispensing! | Check is disabled |
| Display/Function | — | Computer starts dispensing product and Computer displays "Dispensing" with display of cup size, flavors, and additives selected for duration of dispense cycle. | |
| Botton | — | X goes back to Idle and stop dispensing | |
| Dixplay/Function | — | 1. Computer displays "Select Mixer" and "left" under the left most top soft key and "Right" under the right most top soft key for a two dispenser unit.<br>2. Computer will display "LEFTL" and "RIGHTL" and "RIGHTR" under the two right most soft keys if this system is configured with four dispenser modules.<br>3. If any of the mixers are busy or not functional the computer will display the appropriate left or right text crossed out. | |
| Botton | — | Press X to go back to Idle, Check is disabled | 1. Press Soft key above available mixer (not crossed out), then computer goes back to idle display.<br>2. Open blender door.<br>3. Place cup and close door<br>4. Computer starts blending with door closure.<br>5. Blending completes (no beep?) then user removes cup and door should close to allow cleaning cycle. |

Fig. 24

| | System Setup Mode | | | | |
|---|---|---|---|---|---|
| Botton | From Idle Press X | | | | |
| Display/Function | Computer displays "System Setup" with "DISP. Setup", "LOAD Fluids", and "Service" displayed under the the top left, center and right soft keys. | | | | |
| Botton | Press appropriate soft key (DISP Setup, LOAD FLUIDS, or Service) Note other soft keys are disabled | | | | Press X to go back to Idle Mode | Check disabled ? |
| Display/Function | If DISP Setup was selected then the Computer displays "Brightness" on the left and "Contrast" on the right with + and - symbols on each side above and below the associated soft keys. | If LOAD Flluds was selected then the Computer displays "Load Fluids" with "Slot 1", "Slot 2", "Slot 3", "Slot 4", and "Slot 5" across the top of the display respectively and "Slot 6" and "Slot 7" across the bottom left of the display respectively. | | If Service was selected then the Computer displays "Status", "Calibrate", "Maint". | | — |
| Botton | Press X or Check to go back to Setup screen | Press appropriate soft keys to modify brightness and Contrast | Press one of the slot slections | Press X or Check to go back to Setup screen | | — |
| Display/Function | — | Press X or Check to go back to service screen? | 1. Computer displays "Assign Fluid Slot X" on the left side of the display where x is the slot number selected previously. 2. Computer displays list of up to 255? Fluid selections with current fluid highlighted with up down arrows under the top and bottom right most soft keys respectively. | If Status pressed Computer displays? 1. Temp sensor Values. 2. Error log. 3. # of cycles of each product. 4. | If Calibrate is pressed Fluid calibration needed? | If Maint. Pressed 1. Cleaning? 2. Dispensing cleaning fluid? 3. Cycle through modes for service testing? |

*Fig. 25a*

| Botton | | | | System Setup Mode | | | | |
|---|---|---|---|---|---|---|---|---|
| | — | — | Scroll through product using soft keys and select highlighted fluid by pressing check, Soft keys disabled? Goes back to Load Fluids screen? Primes pump? | — | Press X to go back to Load Fluids screen | — | — | — |

| Botton | Language Botton |
|---|---|
| | Press language key at any time |

| Display/Function | Current display changes to a new language each time the button is pressed. When starting English the display changes to the languages and order below: 1. Spanish, 2. French, 4. Canadian, 5. German, 6. Swedish, 7. Portuguese, 8. Italian, 9. Chinese, 10. Japanese, 11. back to English |
|---|---|

Fig. 25b

INTEGRATED METHOD AND SYSTEM FOR DISPENSING BEVERAGE INGREDIENTS

CROSS REFERENCE TO RELATED APPLICATION

This application claims priority to U.S. Provisional Application No. 61/120,772, filed on Dec. 8, 2008, which is incorporated herein by reference in its entirety.

BACKGROUND OF THE INVENTION

1. Field of the Invention

The present disclosure relates generally to an integrated method and system for dispensing and blending/mixing beverage flavor/ingredients, thereby producing a beverage, e.g., a smoothie. More particularly, the present disclosure relates to a system and method for storing the flavor/ingredients, and dispensing the same. The present disclosure also relates to a system and method for cleaning the flavor/ingredient dispensing system in place.

2. Description of Related Art

Multiple steps are involved in creating a beverage or drink, for example, a smoothie drink, from beginning to end, and potential issues can occur at all stages. After ice is added to a blender pot for mixing the beverage, juice and any additional fruit or flavor "mix-in" is added by an operator as well. A size of cup is chosen, and the drink is poured. This last step presents the largest chance for waste. Since the employee must portion the ingredients by hand, any overspill of the drink is left in the blender pot. At each step during this manual process, portion control is compromised, and money is potentially wasted on excess ingredients.

Once the order is complete and the customer has his or her drink, there is one last step to finalize the process—the method of manually cleaning the flavor/ingredient dispensing system, to prevent the transfer of flavors and germs. Depending on where the dispensing system is located within or in relation to the beverage machine, the dispensing system may be very difficult and inconvenient to clean, which adds significantly to the time and labor required for maintenance. Also, flavor contamination can be a serious threat if customers have food allergies.

Each step in this process to create a smoothie takes time, typically four to five minutes, and that time could be better spent serving customers or taking more food and beverage orders, directly contributing to the bottom line.

Although premium beverages such as smoothies are growing in popularity, most quick-service restaurants (QSRs) are unable to offer customers these options due to the time limitations of the quick-serve world. Those QSR owners that do opt to serve smoothies are confronted with a common set of challenges—mainly how to sell the same franchised drink time after time with existing labor and equipment limitations.

Accordingly, it has been determined by the present disclosure, there is a need for an assembly that dispenses and mixes beverage flavors/ingredients with ice in one integrated system, and thereafter can be cleaned in place, for immediate reuse without subsequent flavor contamination.

SUMMARY

An assembly for dispensing and mixing a beverage is provided that includes an ice dispenser assembly, an flavor/ingredient dispensing module, and a blender/mixer/cleaning module as one integrated assembly.

The flavor/ingredient dispensing module comprises: a refrigerated housing, at least one ingredient container disposed within the housing, an ingredient conduit disposed between the ingredient container and the dispensing apparatus, and a pump that causes the ingredient to move from the ingredient container, through the ingredient conduit and into the dispensing apparatus under pressure.

A controller preferably provides integrated control between menu selection, portioning of ice and dispensing of the ingredient(s) based upon the menu selection, and blending and/or mixing based upon the menu selection. The controller also activates the cleaning mode.

The dispensing apparatus is a dispensing nozzle which comprises a centrally disposed ice dispensing conduit and a plurality of ingredient conduits disposed about the ice dispensing conduit, wherein each ingredient conduit is isolated from other ingredient conduits and the ice dispensing conduit, whereby product and/or flavor contamination is avoided.

Thus, in one embodiment the present disclosure provides an integrated beverage blending system. The system comprises an ice portion control module, an ingredient module, and a dispensing apparatus in communication with the ice portion control module and the ingredient module, wherein the ice and the ingredient are dispensed into a beverage container via the dispensing apparatus. The ingredient module comprises an ingredient housing, at least one ingredient container disposed within the housing, an ingredient conduit disposed between the ingredient container and the dispensing apparatus, and a pump that causes the ingredient to move from the ingredient container, through the ingredient conduit and into the dispensing apparatus under pressure.

The above-described and other advantages and features of the present disclosure will be appreciated and understood by those skilled in the art from the following detailed description, drawings, and appended claims.

BRIEF DESCRIPTION OF THE DRAWINGS

FIG. 8 is a front perspective view of an ingredient dispensing module according to the present disclosure;

FIG. 9 is a side view of the ingredient dispensing module of FIG. 8;

FIG. 10 is a front view of the ingredient dispensing module of FIG. 8;

FIG. 11 is a top view of the ingredient dispensing module of FIG. 8;

FIG. 12 is an exploded view of the ingredient dispensing module of FIG. 13;

FIG. 23 is a listing of controller steps for selecting ingredients/flavors, additives and serving cup size according to the present disclosure;

FIG. 24 is a listing of controller steps for dispensing ingredients into a pre-selected serving cup size, selecting which blending/mixer module is to be activated and activating the selected blender according to the present disclosure; and FIGS. 25a and 25b are a listing of controller steps and displays for a system setup mode according to the present disclosure.

DETAILED DESCRIPTION OF THE INVENTION

Figure 1:
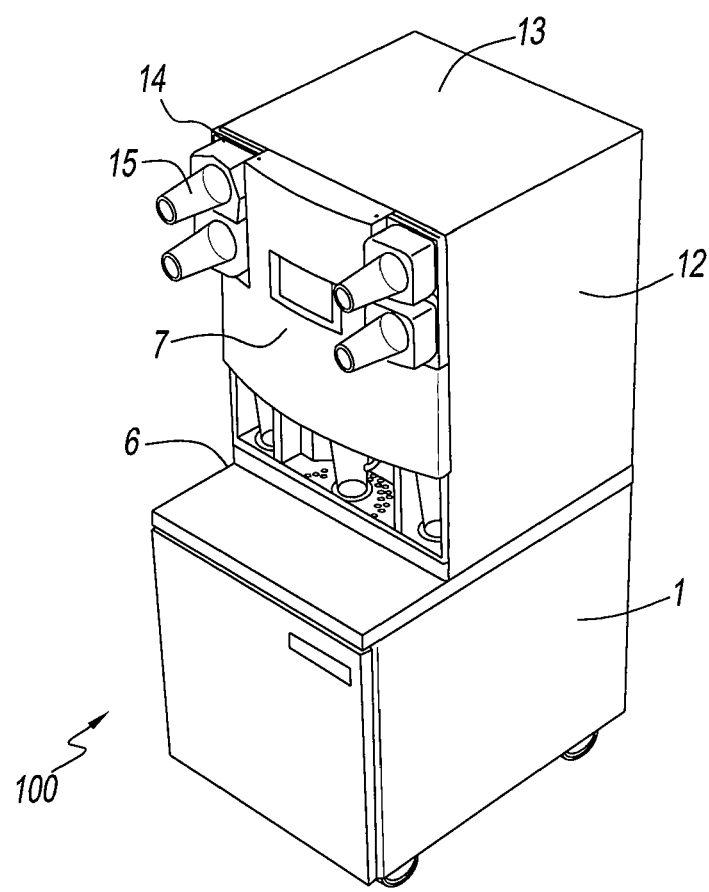
FIG. 1 is a front perspective view of an exemplary embodiment of an assembly that dispenses and mixes beverages according to the present disclosure.
Figure 4:
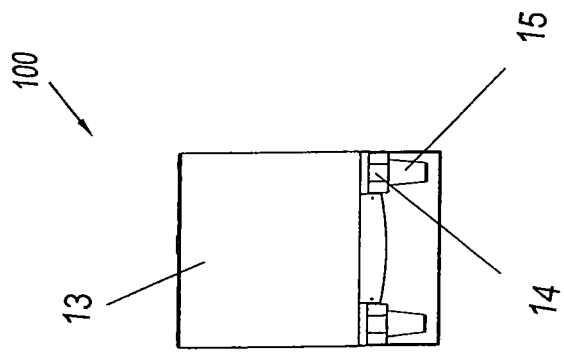
FIG. 4 is a top view of the assembly that dispenses and mixes beverages of FIG. 1.
Figure 3:
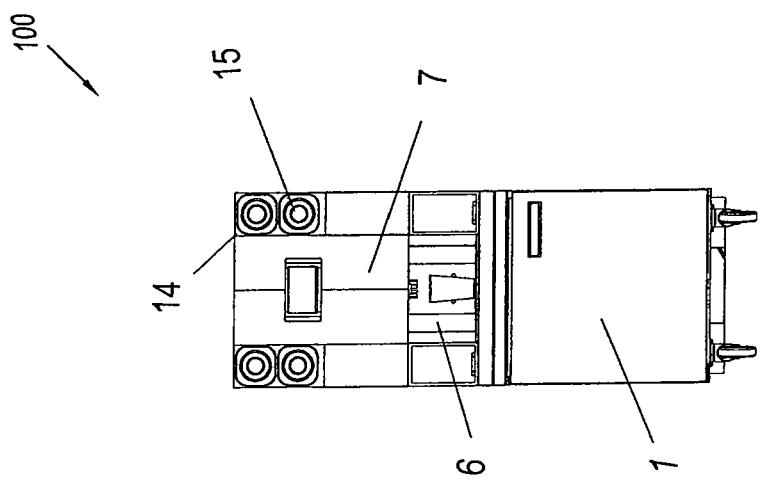
FIG. 3 is a front view of the assembly that dispenses and mixes beverages of FIG. 1.
Figure 2:
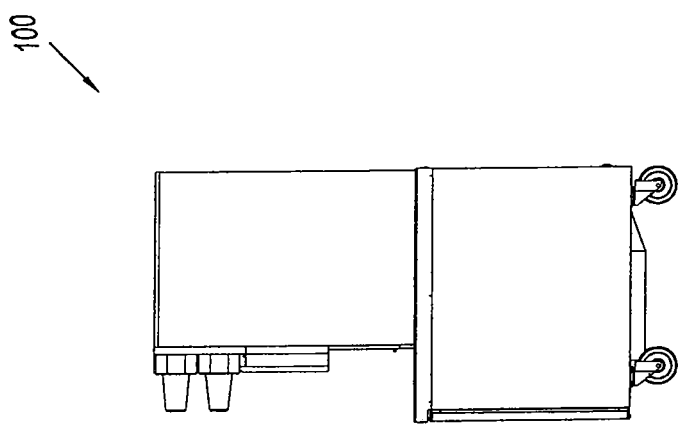
FIG. 2 is a side view of the assembly that dispenses and mixes beverages of FIG. 1.
Figure 5:
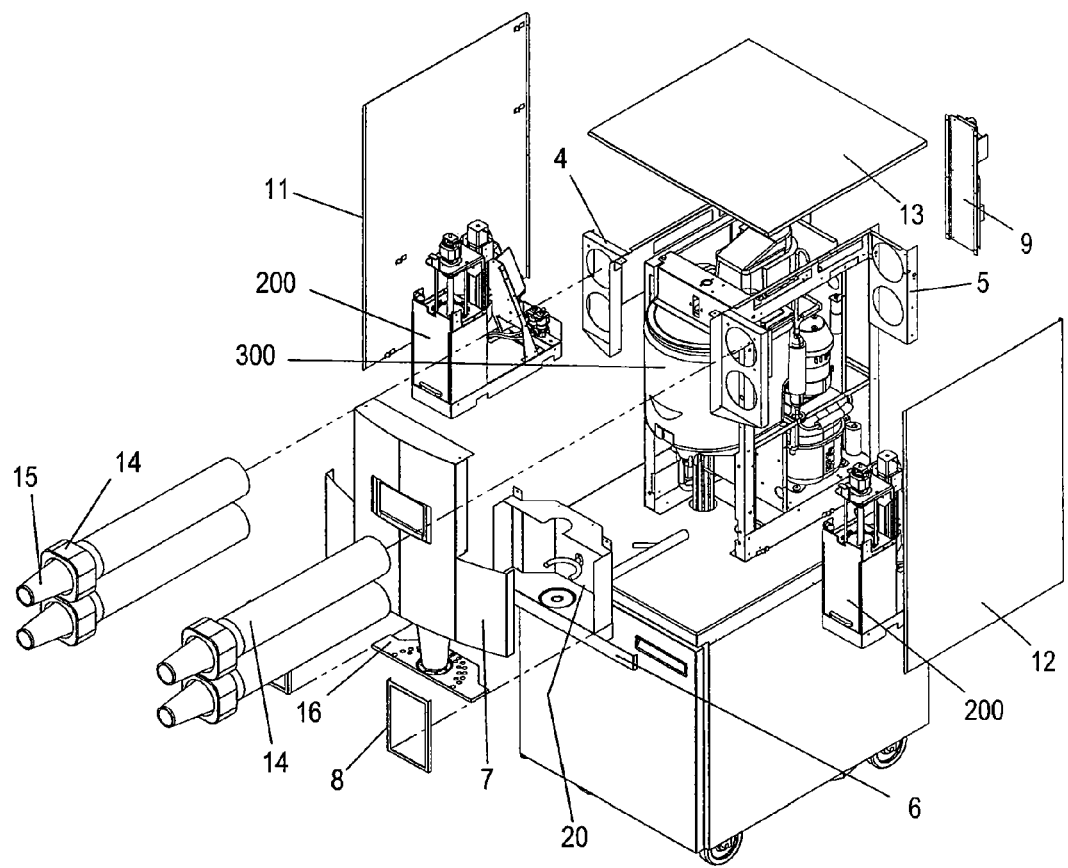
FIG. 5 is an exploded view of the assembly that dispenses and mixes beverages of FIG. 1.

Referring to the drawings and in particular to FIGS. 1-5, an exemplary embodiment of an assembly that dispenses and mixes beverages ("assembly"), according to the present disclosure is generally referred to by reference numeral 100. Assembly 100 makes ice, dispenses flavors/ingredients and ice into a serving cup 15, and then blends or mixes to form a beverage. One such beverage, for example, is a smoothie that preferably includes a flavor ingredient and ice mixed together. Assembly 100 has an onboard ice maker, ice storage and portion control module 300, a flavor/ingredient dispensing module 1100, and a blender/mixer/cleaning module 303. Assembly 100 shows ice maker, ice storage and portion control module 300, flavor/ingredient dispensing module 1100, and blender/mixer/cleaning module 303 as one integrated assembly. It is contemplated by the present disclosure that one or more of ice maker, ice storage and portion control module 300, flavor/ingredient dispensing module 1100, and blender/mixer/cleaning module 303 may be separate from assembly 100, however, it is preferable that they are all integrated into a single assembly 100. That is, vertical placement of ice maker, ice storage and portion control module 300, flavor/ingredient dispensing module 1100, and blender/mixer/cleaning module 303 reduces a size of assembly 100 and its associated flooring footprint in comparison to three separate and distinct machines.

Assembly 100 has a housing that includes a lower wall 6, an upper wall 7, side walls 11 and 12, and a top wall 13. Lower wall 6 has a container holder portion 20. The housing connects cup supports 4 and 5 that secure cup holders 14 to assembly 100. Cup holders 14 removably hold cups 15 therein. Cup 15 may be disposable or reusable single serving cups. If cup 15 is disposable, such as, for example, paper or plastic cups, the beverage dispensed and mixed within cup 15 may be served directly to a customer eliminating the step of pouring the beverage into a serving cup and eliminating labor needed to wash an additional container. Cup 15 may be any size, such as, for example, about 10 ounces to about 32 ounces.

Figure 6:
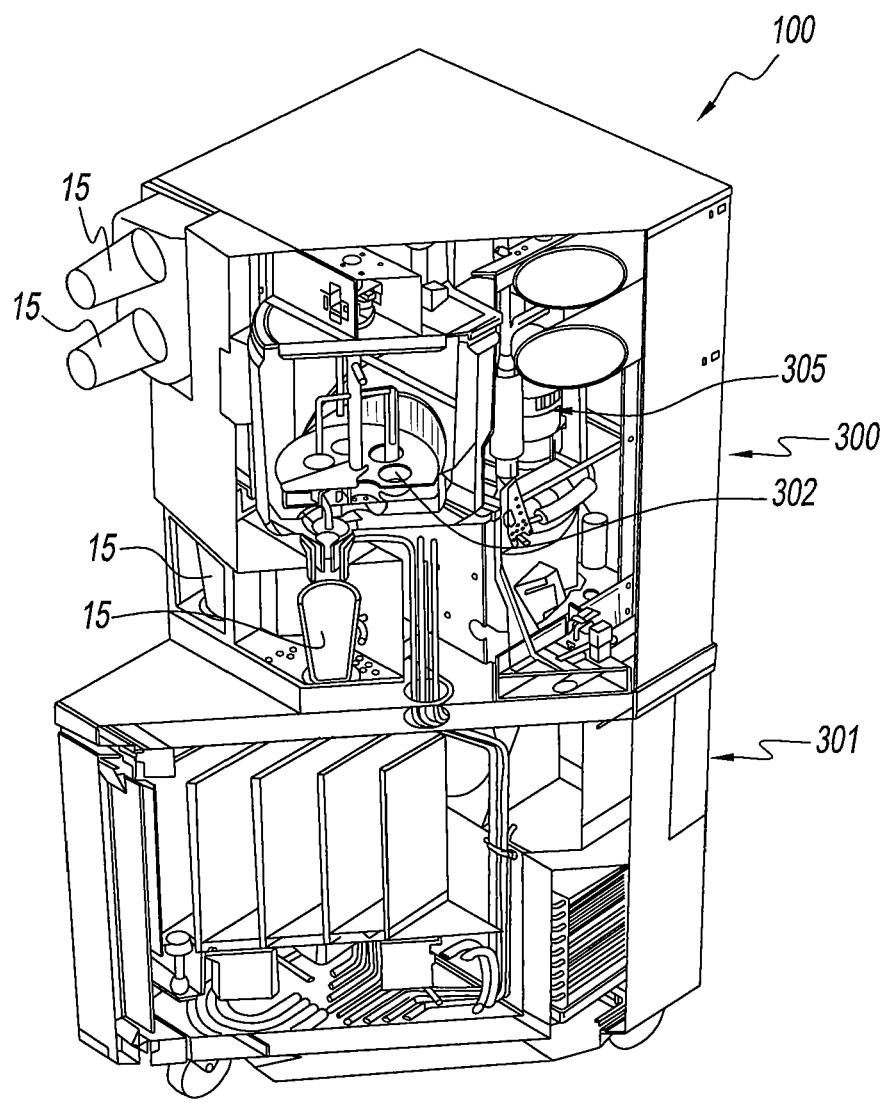
FIG. 6 is a top front left-side perspective view of the system of the present disclosure wherein the front left-side portion has been cut away to depict each of the ice making and portioning module, and dispensing module.
Figure 7:
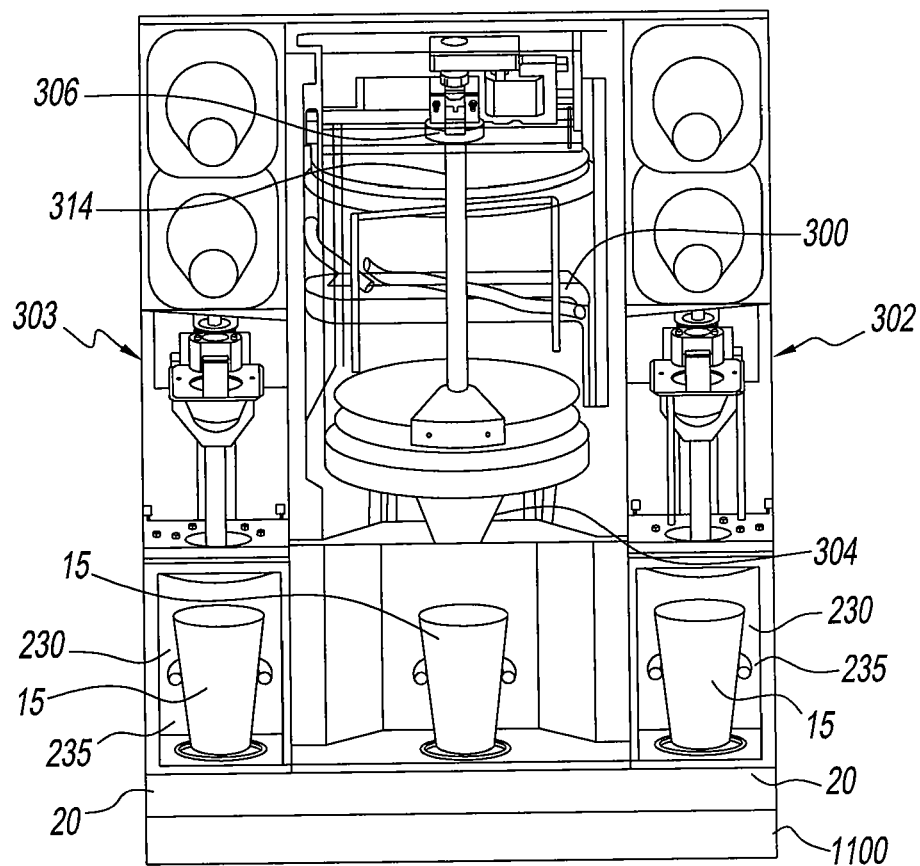
FIG. 7 is a partial front cross-sectional view of the integrated ice maker bin and portion control assembly, dispensing nozzle and pair of oppositely disposed mixer/cleaning modules according to the present disclosure.

FIGS. 6 and 7 provide an overview of the integrated assembly 100 according to the present disclosure, wherein assembly 100 comprises: flavor/ingredient dispensing module 1100, ice maker, ice storage and portion control module 300 and a pair of blender/mixer/cleaning modules 303 disposed on opposite sides of dispensing nozzle 304. Further aspects of assembly 100 are discussed in greater detail in co-pending United States patent application having Ser. No. 12/633,790, entitled "AN INTEGRATED METHOD AND SYSTEM FOR DISPENSING AND BLENDING/MIXING BEVERAGE INGREDIENTS," filed on Dec. 8, 2009, which is herein incorporated by reference.

Referring to FIGS. 8-17, flavor/ingredient dispensing module 1100 is shown. Referring to FIG. 12, flavor/ingredient dispensing module 1100 has an ingredient housing 1110. Ingredient housing 1110 can include a refrigeration cycle, such as, for example, a vapor compression cycle that includes a compressor, condenser, expansion valve, and evaporator. One or more of the compressor, condenser, expansion valve, and evaporator may be integral with flavor/ingredient dispensing module 1100 or remote from the rest of flavor/ingredient dispensing module 1100. For example, compressors may create undesirable noise and may be remotely located from the rest of assembly 100.

Ingredient housing 1110 can cool one or more holders or cassettes 1115. Holders 1115 each hold a flexible container (not shown) via a hanging rod 1116 (see FIG. 17). The flexible container can be, for example, a bag, that contains an ingredient for the beverage. Hanging rod 1116 can thread holes in the top of the flexible container, to support the container. The ingredient can be cooled while stored in holders 1115 by ingredient housing 1110, so that the ingredient is maintained at a food-safe temperature. Alternatively, ingredient housing 1110 can keep holders 1115, and the containers within them, at ambient temperature. The bag may be a 2.5 gallon bag. The ingredient may be a flavored liquid or mix. Each of the containers within holders 1115 can hold different ingredients, or alternatively, two or more of the containers can hold the same ingredient. Ingredient housing 1110 has a door 1111 and wheels 1113.

In the shown embodiment, flexible containers would be held in a vertical orientation, which helps to ensure a maximum extraction of ingredient from the flexible container. The present disclosure contemplates, however, a horizontal orientation for holder 1115, and the flexible container disposed therein. In this horizontal orientation, each holder 1115 would slide into ingredient housing 1110 using guides. A connector located at the back of holder 1115 can connect the flexible containers within holders 1115 to connection tube 1117, which is also at the back of ingredient housing 1110.

Each of holders 1115 has a connection tube 1117 connected thereto, so that the ingredient flows out of the flexible container, into one end of connection tube 1117, and out of the other. Connection tube 1117 can be integrally formed with the flexible container, or alternatively there can be a connector on the flexible container that allows for connection to connection tube 1117 and/or holder 1115. Connection tube 1117 has an aperture or gap 1118 (see FIG. 6a) at an end of connection tube 1117 that is connected to holder 1115 and the flexible container. Gap 1118 is a small opening or notch, for allowing substantially all of the flavor/ingredient disposed in the container to be removed without concern regarding the collapsing of the container (not shown). As the container is emptied of its contents, it collapses on itself, and may block the opening of connection tube 1117 that is connected to it. This would impede the further extraction of the flavor/ingredient from the flexible container. Gap 1118 allows more ingredient to be extracted, even in a situation where the container holding the ingredient is collapsed over the end of connection tube 1117.

Figure 13:
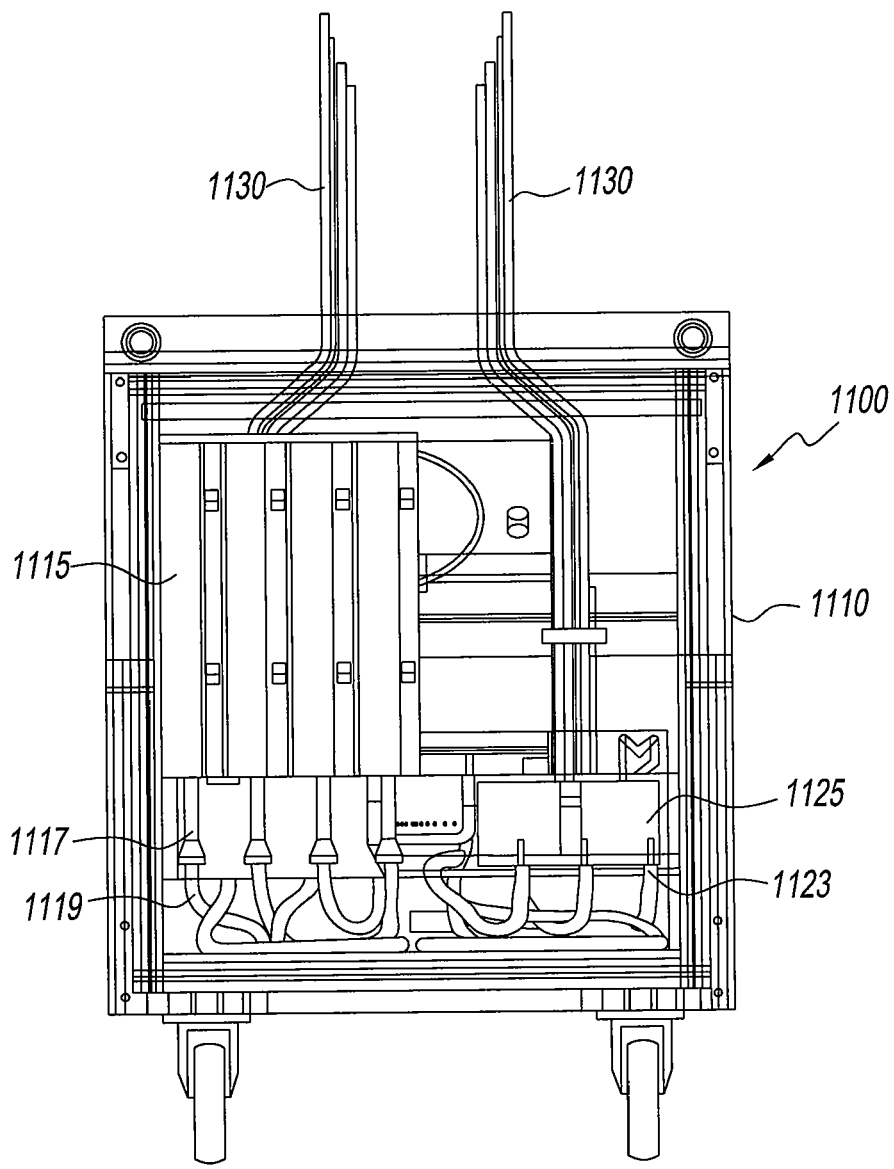
FIG. 13 is a front perspective view of an ingredient dispensing module according to the present disclosure.
Figure 13A:
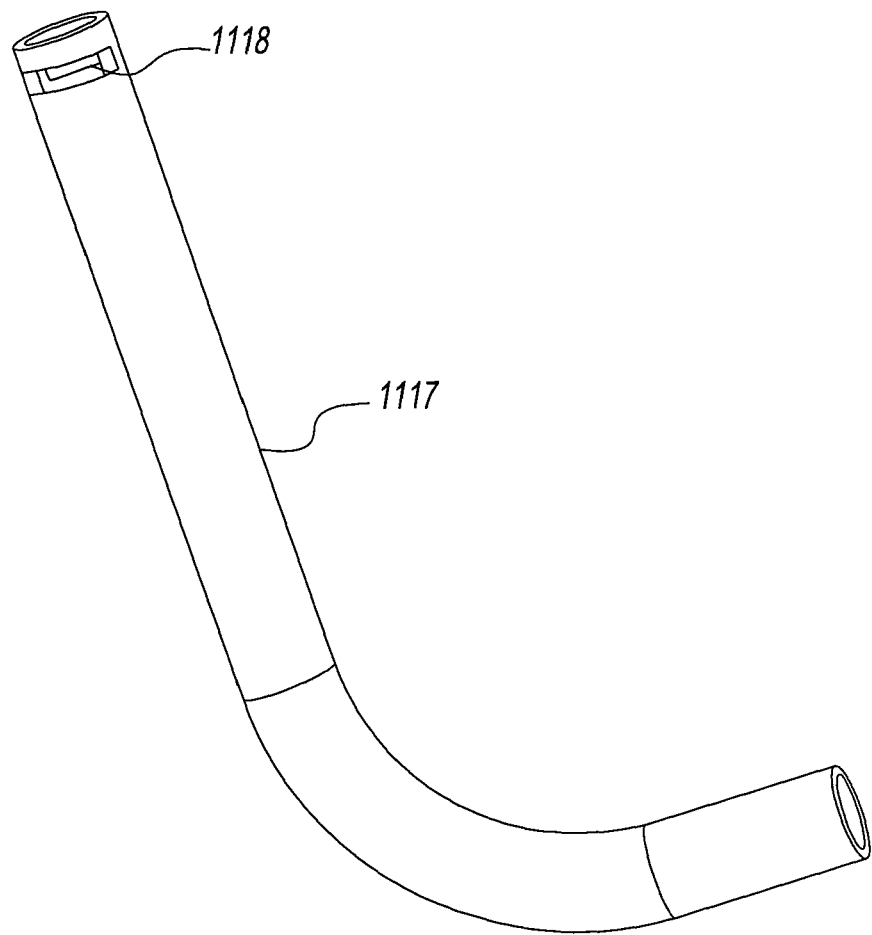
FIG. 13a is a connection apparatus for use with the ingredient dispensing module of FIG. 13.

Connection tube 1117 of each of holders 1115 is connected to a conduit 1119 that passes through a base 1120. As shown in FIG. 13, conduit 1119 may connect to a pump rack 1123. Pump rack 1123 has one or more pumps 1125 that selectively move a portion of the ingredient from the flexible container in holders 1115 through connection tube 1117, to conduit 1119, to a line conduit 1130, and to dispenser nozzle 304 to dispense the ingredient out of assembly 100, for example, to cup 15. The ice and the ingredient are dispensed into cup 15 but are segregated from each other until dispensed into cup 15 to prevent contamination. There is an ingredient dispenser tube for each ingredient in each of holders 1115 and one ice nozzle in nozzle 304. See FIGS. 15 and 16 for a view of nozzle 304 formed by injection molding of a plastic material to provide an ice chute conduit 1126 centrally disposed within nozzle 304 and a plurality of flavor/ingredient dispensing apparatus 1127.

Figure 14:
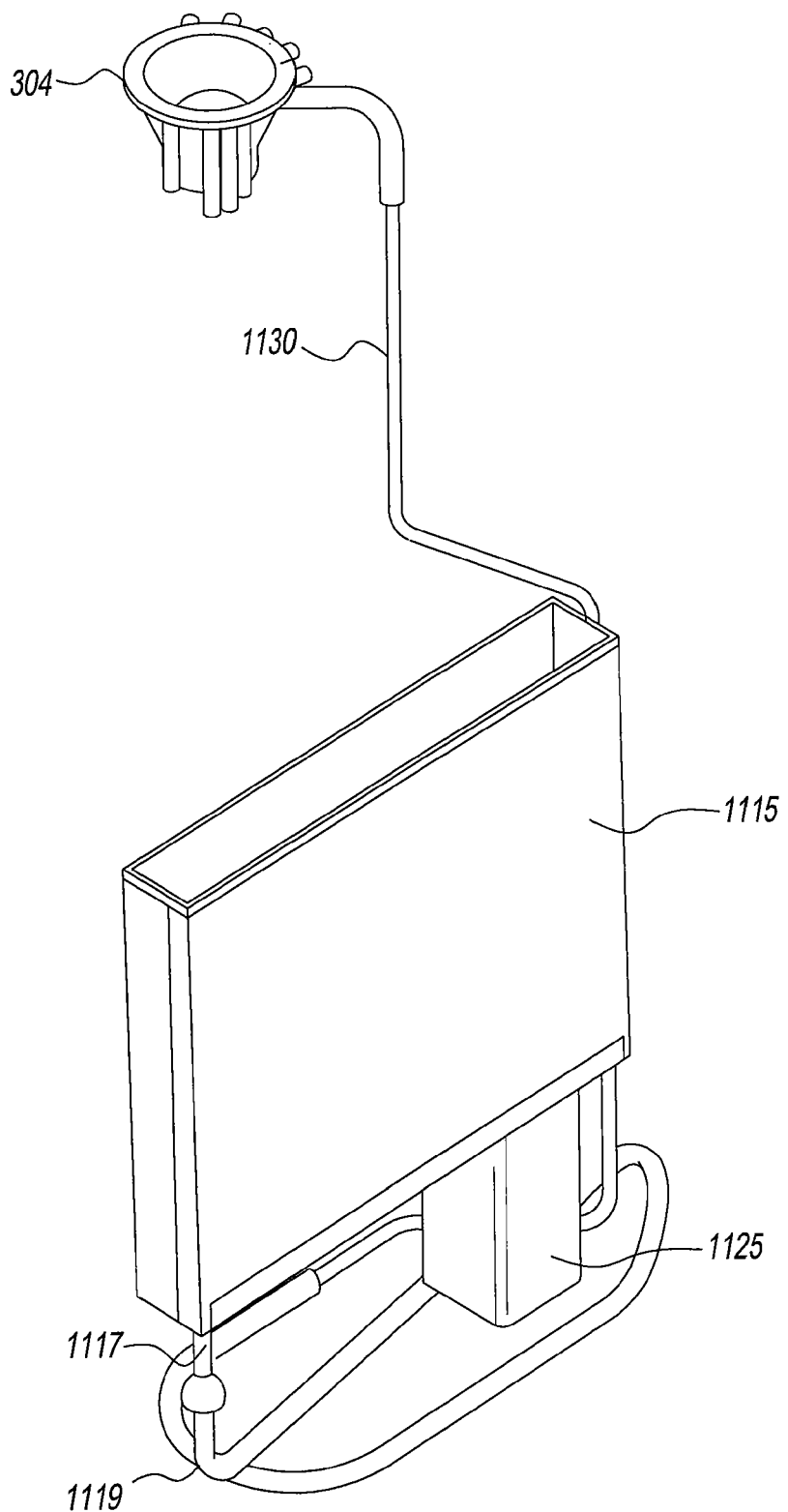
FIG. 14 is a front perspective view of an flavor/ingredient dispensing module according to the present disclosure.
Figure 15:
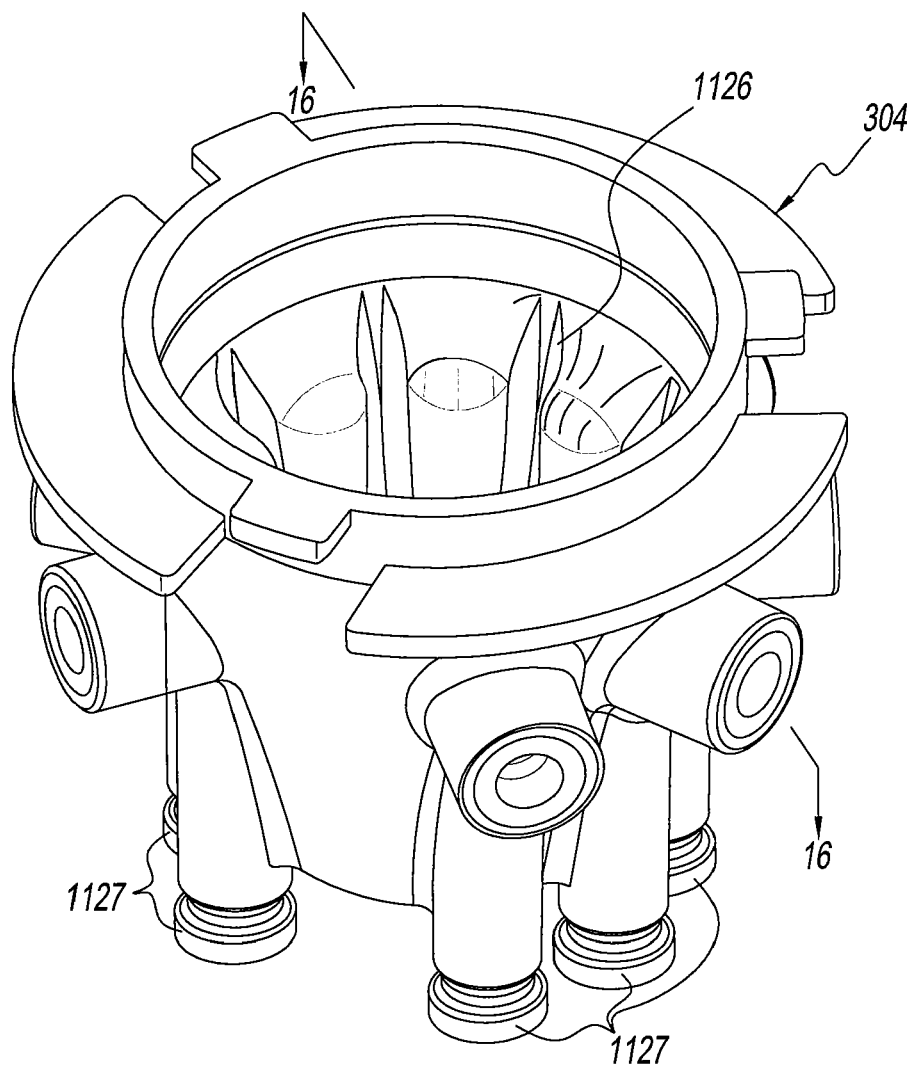
FIG. 15 is a top front side perspective view of a ice chute and ingredient dispensing nozzle according to the present disclosure.
Figure 16:
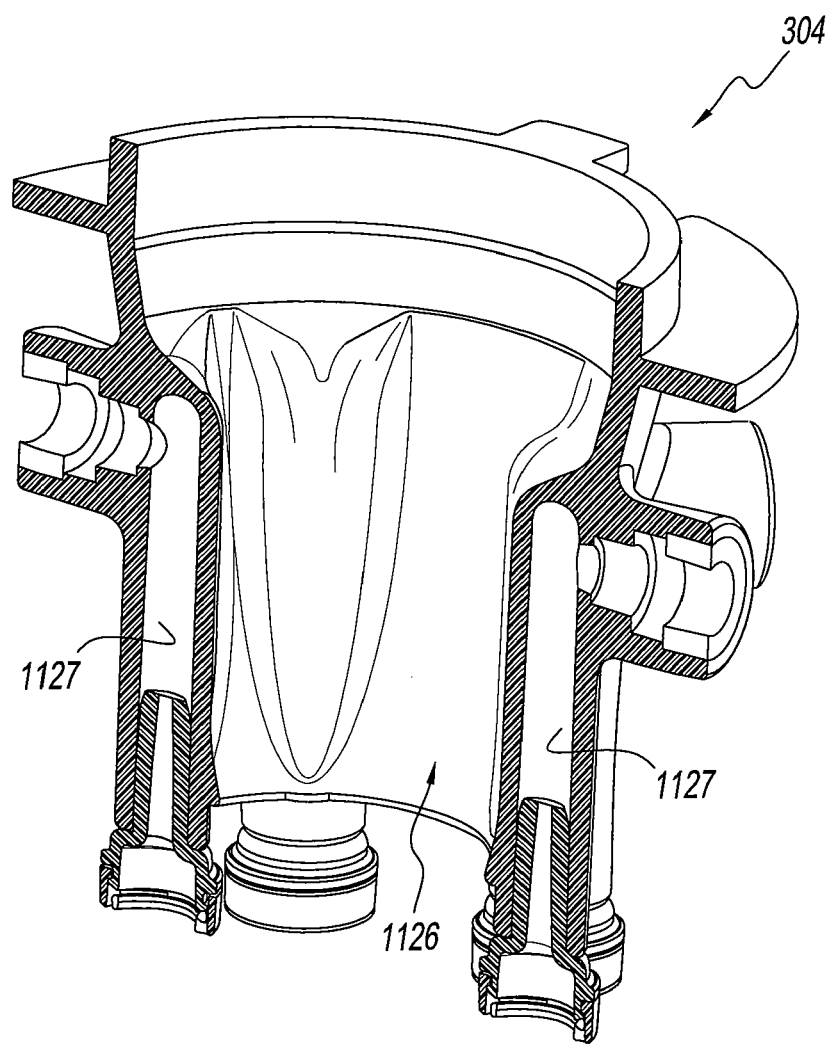
FIG. 16 is a cross-sectional view of the nozzle of FIG. 8 along line 9-9.
Figure 17:
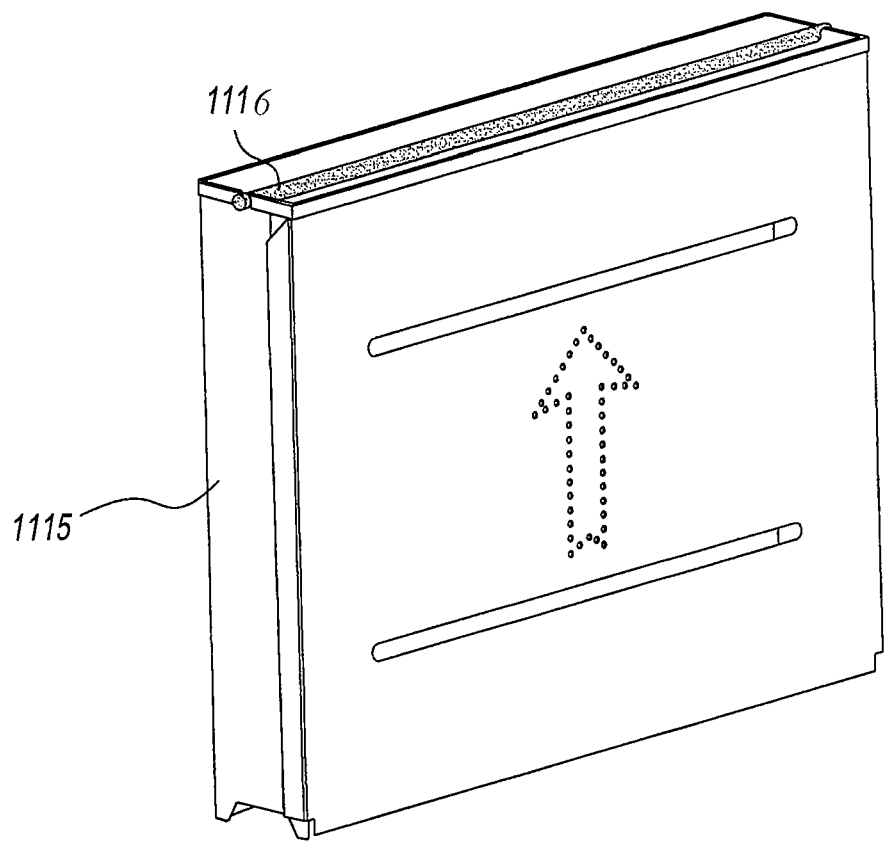
FIG. 17 is a top front right side perspective view of a ingredient dispensing cassette with a support bar according to the present disclosure.

As shown in FIG. 14, conduit 1119 may connect to a pump 1125. Pump 1125 selectively moves a portion of the ingredient from the container in holders 1115 through connection tube 1117, to conduit 1119, to a line conduit 1130, and to dispenser nozzle 304 to dispense the ingredient out of assembly 100, for example, to cup 15. Pump 1125 may be an air powered pump that may include a diaphragm. Pump 1125 may also be a pressure pump, or a peristaltic pump. When pump 1125 is a pressure pump, it provides a constant pressure within holder 1115, that is applied to the flexible container. Holder 1115 would have to be sealed for this to be effective. A solenoid can regulate flow of the ingredient out of the flexible container. When the solenoid is opened, the ingredient will flow out of the flexible container at a known rate, given that the pressure applied to the flexible container and the impedances of the system are also known, as discussed below. This pressurized pumping system has been found to be particularly effective for ingredients that include "stringy" components, such as pulp.

A portion of the ingredient, such as, for example, a fruit base, may be controlled by time. A controller maintains accuracy by determining an amount of the fruit base that has been delivered from the flexible container in holder 1115. As a fluid level decreases within the container within holder 1115, the controller allocates a longer delivery time to compensate for a decrease in head pressure within the container within holder 1115. Pump 1125 may be positive displacement and a controller controls the pumps on a time basis. The time can be adjusted to control portion accuracy. Assembly 100 may only dispense ice from ice maker, ice storage and portion control module 300 into cup 15 and not an ingredient from flavor/ingredient dispensing module 1100.

Figure 18:
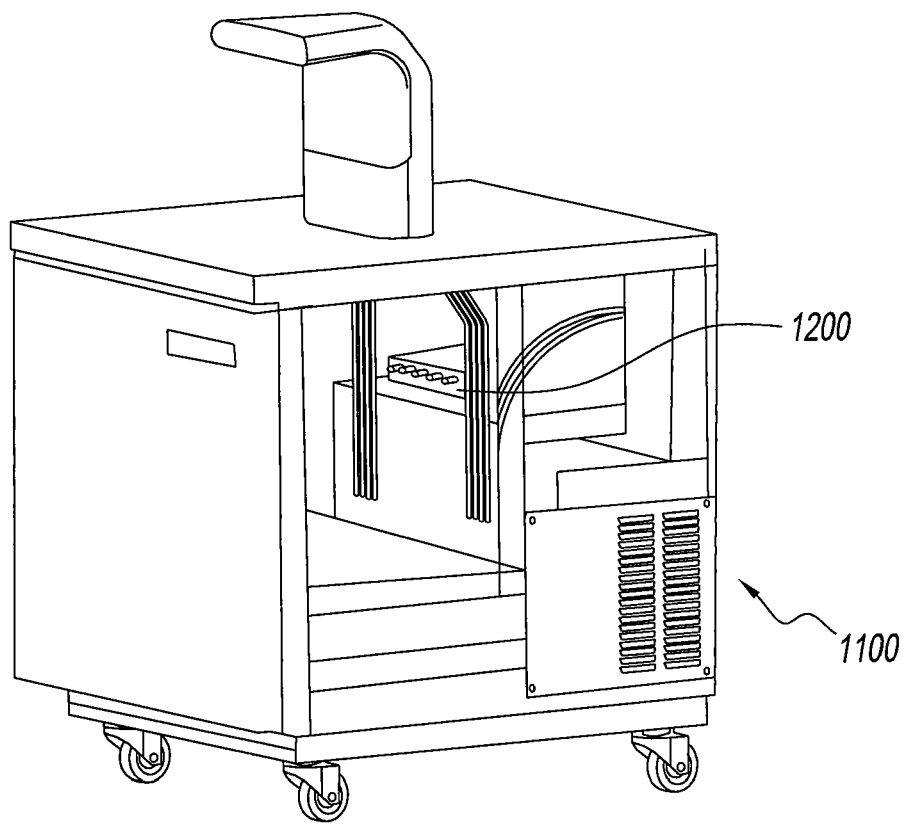
FIG. 18 is a transparent, perspective view of a flavor/ingredient dispensing module of the present disclosure.

A water reservoir (not shown) can be within ingredient housing 1110, or alternatively can be located remotely from ingredient housing 1110. In either embodiment, the water reservoir can be used to provide water to the beverages made by the machine. In addition, the water reservoir can be used to clean out dispensing module 301 in place. This feature has the benefit of significantly reducing the amount of labor required to keep dispensing module 301 clean, and avoid flavor contamination when different ingredients or flavorings are switched out of ingredient housing 1110. The water reservoir can be connected to any point on the line for dispensing the ingredient to dispenser nozzle 304. For example, the water reservoir can be connected to any of connection tube 1117, conduit 1119, or line conduit 1130. A manifold 1200, as shown in FIG. 18, can be used to connect the water reservoir to these components, either manually or through the use of solenoid valves.

For cleaning, clean water can be run through the ingredient dispensing system. Alternatively, detergent can be placed in the water reservoir, and/or in manifold 1200. The detergent can be in liquid or pill form. The water and/or the detergent is circulated through the flavor/ingredient dispensing system as described above, and then drained from ingredient housing 1110. The water reservoir is then filled again, and purged, to ensure that there are no residual detergent chemicals left in the system. The reservoir is then refilled.

Figure 19:
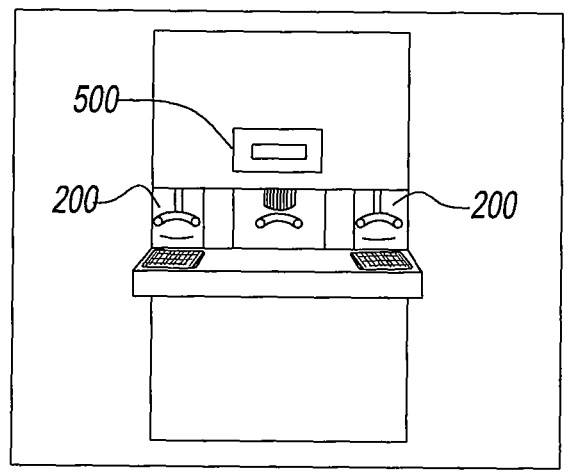
FIG. 19 is a front planar view of an exemplary embodiment of the system according to the present disclosure.
Figure 20:
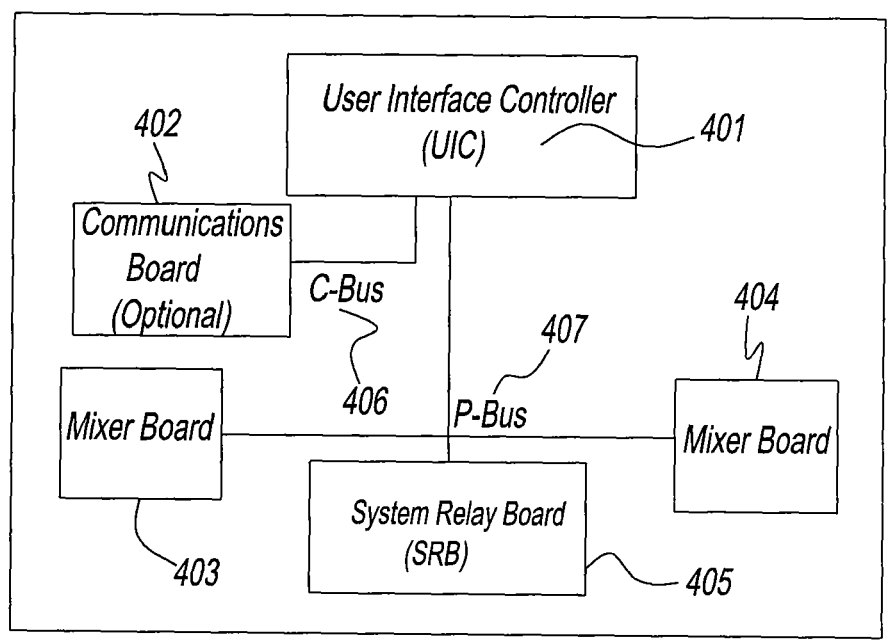
FIG. 20 is a block diagram of an exemplary embodiment of a system according to the present disclosure.
Figure 21:
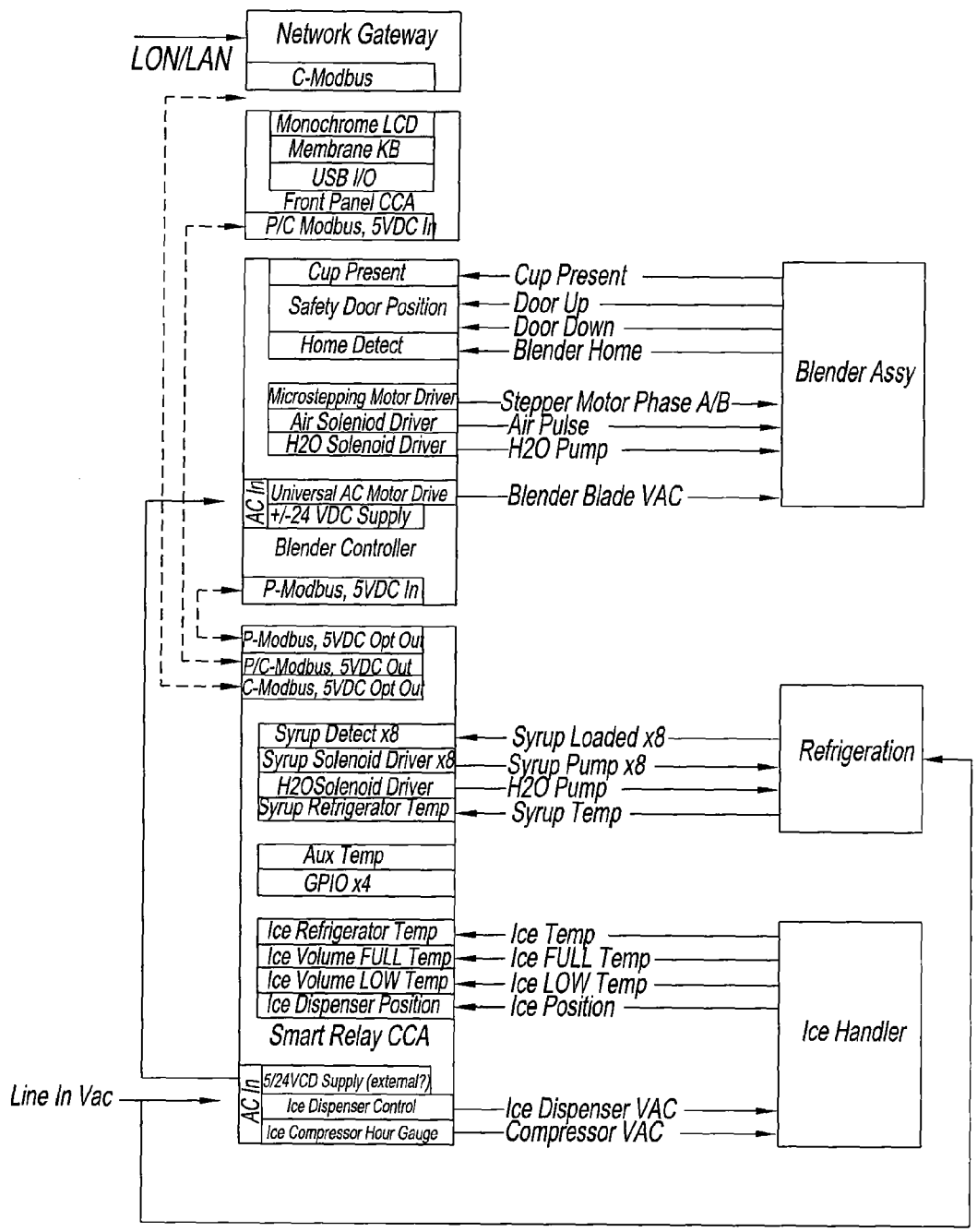
FIG. 21 is a block diagram of the network gateway, front panel display controller, blender/mixer and cleaner module controller and ice making and portion controller according to the present disclosure.
Figure 22:
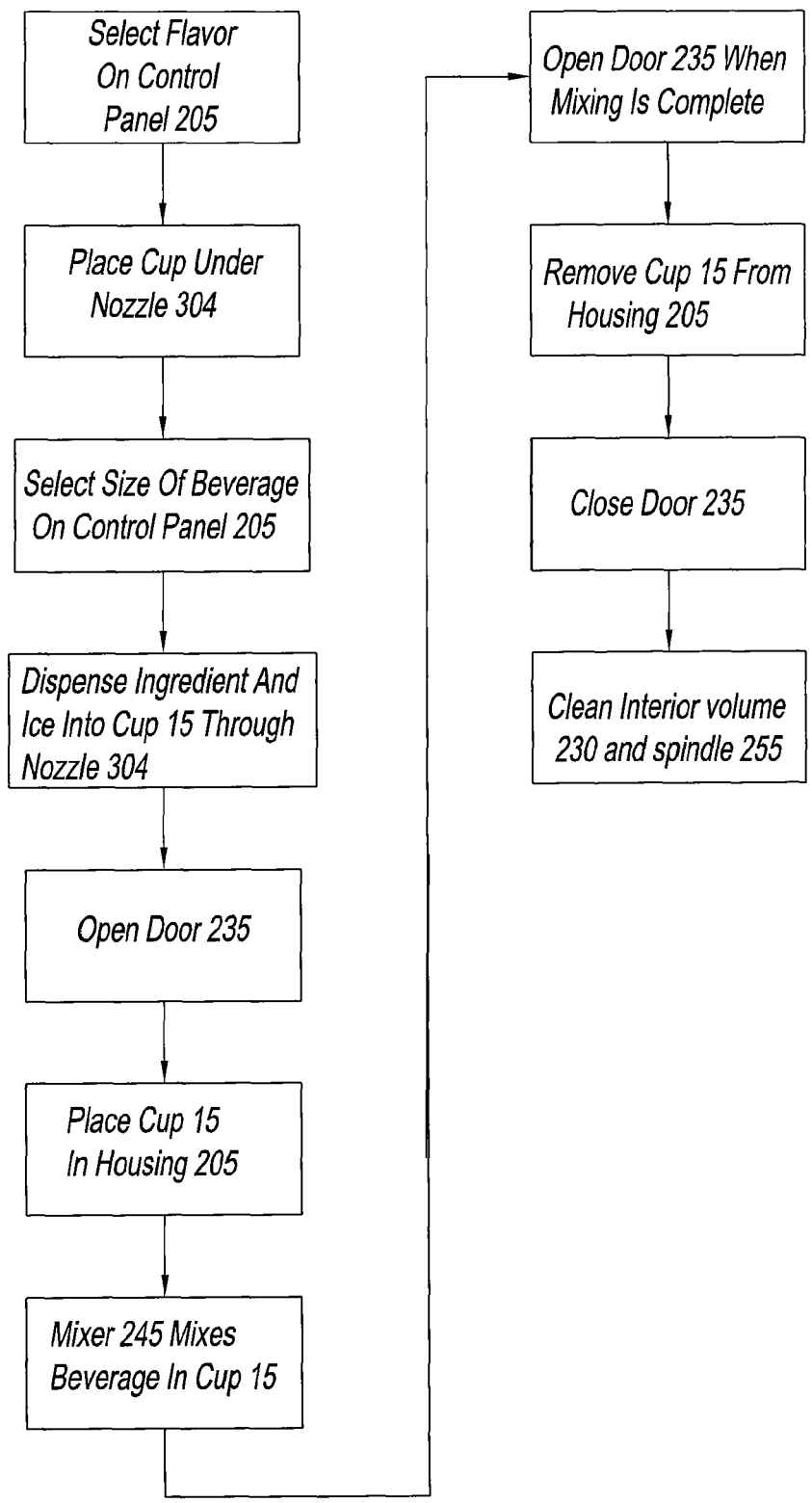
FIG. 22 is a process flow diagram of an exemplary embodiment of a method for dispensing, blending/mixing and cleaning according to the present disclosure.

FIG. 20 shows a structure of control boards identifying that they are separate but interconnected. This provides flexibility in the design allowing additional boards to be added without re-designing the entire controller. FIG. 21 shows a user interface controller 401 that incorporates a button panel, such as a control panel 500 shown in FIG. 19, that an operator uses to select the drink as well as a computer that interconnects to other control boards. A communications board control board 402 provides a gateway for communication to various methods (web, modem, USB, and the like.). Mixer boards 403 and 404 are mixer control boards that contain logic controllers for the operation of mixer blender blade 255 and linear slides 240. Smart relay board 405 is a control board that houses switching relays for ice maker, ice storage and portion control module 300, flavor/ingredient dispensing module 1100, mixer spindle motor 240, linear slides 241, water solenoid 280, and air solenoid 220a. C-bus 406 is a communication interconnect. P-bus 407 is a wiring interconnect between boards.

FIG. 21 is block diagram showing inputs and outputs of assembly 100. Network Gate C modbus Communication module that allows communication via modem, internet, and the like. Front Panel CCA User interface that includes Monochrome LCD, Membrane KB and USB i/o. Blender controller receives sensor input from blender/mixer/cleaning module 303 that determines the presence of cup 15, the home location of the spindle, and contains control logic for initiating mixer motor and linear drive motor, water and air solenoid signals. Blender controller has a controller for handling control of refrigeration system including syrup solenoid driver, water solenoid driver, syrup bag presence detection, and syrup temperature. Blender controller has additional capabilities of monitoring temperature of ice, level of ice in bin, low temperature alarm, and dispenser position.

Definitions, acronyms, and abbreviations may include:

| Abbreviation | Definition |
| --- | --- |
| UIC | User Interface Controller |
| SRB | System Relay Board |
| P-BUS | Peripheral bus |
| C-Bus | Communication Bus |
| CCA | Circuit Card Assembly |
| SFR | System Functional Requirements |

Referring to FIGS. 19 and 20, assembly 100 may be a "Smoothie maker system" that consists of an integrated ingredient dispensing unit, up to 4 mixing units (expandable from 2 in normal configuration), and a control panel for user operation.

As depicted in FIG. 21, the system is designed using a Smart Relay CCA, two mixer CCAs (normal configuration), an optional communications board for external communications, and a user interface controller board. All of the subsystem boards communicate with each other using a MODBUS protocol and RS-485 physical link.

Smart Relay CCA is responsible for dispensing control, monitoring and safety of the system ice-maker, and flavoring assembly/subsystem. Also the Smart Relay CCA provides the power and Modbus hub for the Smoothie System control electronics.

The Blender Controller CCA is responsible for position, speed, cleaning and safety control of the system blender assembly/subsystem, such as blender/mixer/cleaning module 303. It controls the blender blade, water and air pumps and senses cup present and door switch.

The user interface controller board consists of a monochrome LCD display, membrane keypad for control and configuration.

Referring now to FIGS. 19-25b, functional requirements of an exemplary embodiment of the present disclosure are shown and described.

The system shall have method for configuration for the following:
1. Mixing profiles
2. Particular fluids selections (x out of 254 displayed) [SFR-101]

The system shall automatically go into a configuration download menu if in idle when a SD card is inserted [SFR-102]

The User Interface shall have a degrees F/C selection for temperature display in the setup mode. [SFR-103]
SFR:009 Dispenser Flavor(s)

The maximum Number of Flavors per Serving shall be 3 [SFR-009]

SFR:010 The minimum Number of Flavors per Serving shall be 1, unless dispensing ice only [SFR-010]

A flavor selection status shall be toggled by pressing the button corresponding to the flavor in question [SFR-011]

Upon reaching the maximum Number of Flavors per Serving, the system shall not allow selection of any additional flavors; unselected flavors become locked-out [SFR-012]

The user shall be able to change the flavor selection(s) by pressing the CANCEL button and selecting desired flavor(s) [SFR-013]

The user shall be able to change the flavor selection(s) by first de-selecting a (the) flavor(s), then selecting the desired flavor(s) [SFR-014]

Unit shall monitor use cycles of flavors and provide a user indication on the display of low level for each flavor for early warning of flavor out.
Dispenser Additive(s)

The additives consist of a selection of 2 types of fresh fruit and yogurt. Only the yogurt is dispensed automatically; instead of dispensed, the fresh fruit has to be manually added. The fresh-fruit selections are used to compute the amounts that are dispensed. Fruit is placed in cup prior to receiving the ice and fruit.

The Maximum Number Of Selectable Additives shall be 3 [SFR-015]

The Minimum Number Of Selected Additives shall be 0 [SFR-016]

Refrigerated Base (Flavor Storage)

The Fruit flavors and yogurt shall be stored in a refrigerated base designed to maintain a product temperature between 34° F.-38° F. [SFR-083]

Base will be designed to accommodate up to 8 flavors (6 flavors is default for general market). [SFR-084]

The base design will be such that flavors can be stored in Mylar "bag-in-box" packaging [SFR-017]

SFR:018 The base will house flavor pumps (up to 8) and all associated delivery tubing, and air solenoid switches [SFR-018]

The base will be designed to intake and discharge condenser air from the front of the unit [SFR-019]

The base dimensions will be: 26" w×33" d×32" h [SFR-020]

The base will be mounted on castors to allow access to rear of unit for cleaning [SFR-021]

The base will be designed to meet NSF and UL requirements. [SFR-022]

The base will have openings in top to allow tubing to pass into dispense area [SFR-023]

The base will provide a method air delivery and return to dispenser section to maintain product temperature to the dispense nozzle (per NSF) [SFR-024]

The base refrigeration system will require 120v AC with the option for 220v/50 hz (Europe requirement) [SFR-025]
Ice Making Smoothie machine will have on-board ice making capabilities The device shall have ice machine capability to store 9 kg of ice in addition to ice making capabilities [SFR-026]

The ice machine shall generate hard nugget ice [SFR-027]

The ice machine will have the capability to generate a minimum of 240 lbs of ice per day [SFR-028]

The ice machine will be designed to operate on 120V 60 hz+/−10% [SFR-029]

The ice machine shall have provisions for 220 50 Hz operation for Europe +/−10% [SFR-030]
Ice Dispensing Ice is normally dispensed during the smoothie making process but could also be dispensed exclusively.

The system shall allow dispensing of ice in an exclusive manner (i.e. without flavors or water) [SFR-031]

Ice shall be dispensed in a portion amount that allows scaling for various drink cup sizes [SFR-032]

Ice amount shall be dispensed with an accuracy of ±10% [SFR-033]

The system shall provide a button for ice only dispensing [SFR-034]

Upon selection of the ice-only button, the system shall proceed to cup size selection [SFR-035]

The ice-only button shall only be available when no flavors are selected.

Conversely, upon selection of a flavor the ice-only button shall be disabled [SFR-036]

There shall be a Service maintenance mode to allow cleaning on the dispenser fluid lines [SFR-100]
Cup Size Selection The system shall allow cup size selections of small, medium large, and extra large, with a provision for additional cup sizes determined by customer [SFR-037]

Provisions will be made for cup storage on the unit [SFR-038]

Cup size selection shall trigger the dispensing process [SFR-039]

There shall be up to five configurable cup sizes with configurable volumes. [SFR-040]

Cup shall be placed under dispense nozzle prior to drink selection (no UI to tell you) [SFR-041]

Dispensing

The dispensing process shall use the cup size as a scaling factor to compute ingredient amounts; water, ice and selected flavors/additives [SFR-042]

The ingredients and quantities dispensed shall be used to determine the mixing profile [SFR-043]

Fruit flavor ingredients shall be delivered using air driven condiment pumps [SFR-044]

Condiment pumps shall be located in the refrigerated space [SFR-045]

Condiment pumps shall be removable for easy access for service [SFR-046]

Condiment pumps shall be energized using solenoid valves mounted in the air flow to the pumps [SFR-047]

Condiment Pumps shall deliver a portioned amount of flavor with an accuracy of ±10% [SFR-048]

The amounts of ingredients used for each smoothie including a total of 8 flavored fluids, water, ice and up to 2 manually added types of additives shall be determined by the Dispense Algorithm. [SFR-080]

Mixing

The mixing process includes the actual mixing of the ingredients in a cup and a subsequent cleaning cycle to ensure that the blender's blades are clean for the next mixing cycle.

The mixing operation shall be asynchronous to the dispensing operation [SFR-049]

The mixing operation shall be determined by the current mixing profile and shall take no longer than 20 seconds. [SFR-050]

The mixing operation shall consist of 2 steps, blending & washing [SFR-051]

The mixer shall be designed as a module that attaches to the ice machine and refrigerated base [SFR-052]

The mixer module shall consist of a mixer spindle, blade, a linear slide, cup holder with water nozzles [SFR-053]

To access the mixer module a protective door must be raised [SFR-054]

The mixer module door shall contain micro-switches to locate the door position and to provide a lockout [SFR-055]

Mixer Sequence of Operation

The drink is placed into the cup holder and the door is closed.

When the closure of the door has been identified the mixer shall begin the mixing process. [SFR-065]

The mixer spindle shall index (via linear slide) down into the drink cup 2.5 inches from home position [SFR-066]

After initial contact the mixer blade shall be energized [SFR-067]

The spindle shall dwell at the initial engagement point for a period of 3 seconds. [SFR-068]

The spindle shall then index into the drink to a depth of cup of approximately 75%. [SFR-069]

The spindle shall dwell in this location for a period of 15 seconds. [SFR-070]

The spindle shall then return to the initial location and continue to mix for a period. [SFR-071]

Upon completion the mixer blade shall be de-energized and the spindle returned to its' home location. [SFR-072]

The door is then opened and the drink is then removed and served

Mixer Cleaning Process

After the mixer sequence the module shall begin the cleaning process when the mixer door is closed. [SFR-073]

The cleaning process shall start with the spindle being lowered into the mixing cavity and the spindle blade energized. [SFR-074]

A water solenoid shall be energized for 3 seconds and begin to spray rinse the spindle and cavity after the spindle blade is energized during a mixer cleaning cycle. [SFR-075]

An air solenoid connected to the water line shall be energized to provide a high pressure blast of water during the mixer cleaning cycle. [SFR-076]

The module shall be designed to operate with sanitizing agents in addition to water. [SFR-077]

The unit shall be able to detect run out of sanitizer fluid. [SFR-104]

When the mixer cleaning cycle has ended, the solenoids are de-energized and rinse water is drained. [SFR-078]

The mixer cleaning cycle shall take no longer than 5 seconds. [SFR-079]

Mixing Profile

A mixing profile determines the steps to be performed during the mixing operation. Each step in the mixing profile specifies spindle's speed and time (how fast for how long) as well as position (with dwell time).

A normal and Additive included mixing profile shall be available for each cup size. [SFR-056]

When a non-dispensed-additive is selected, the mixer shall use the Additive mixing profile [SFR-057]

When NO non-dispensed-additives are selected, the mixer shall use the normal mixing profile [SFR-058]

The mixing profiles shall be customer configurable. [SFR-059]

User Interface Controller (UIC)

Display use shall be OPTREX F-51851GNFQJ-LY-AND or equivalent [SFR-060]

The UIC shall support handling of USB storage devices formatted with FAT16. [SFR-061]

The UIC shall be capable of connecting to the C-Bus [SFR-062]

The UIC shall provide 1-press on-the-fly language switch [SFR-063]

The UIC shall be the P-Bus master [SFR-064]

System Relay Board

Power-up

The relay board shall be responsible for determining the system configuration including fluids loaded and number of blenders and relaying to the Blender control board Blender Control Board Peripheral Bus (P-Bus The peripheral bus or P-Bus shall connect the User Interface Controller to the system's peripherals (the System Relay Board and the Mixer Control Boards) [SFR-087]

Physical Layer

The peripheral The P-Bus shall use RS-485. [SFR-088]

SFR:088

SFR:089 The peripheral The User Interface Controller shall be the bus master (client). [SFR-089]

Protocol

The P-Bus shall use ModBus RTU. [SFR-090]

Communication Bus (C-Bus)

Physical Layer

Protocol

User interface and Configuration/Setup Modes

Product Mode—See Appendix A. [SFR-091]

System Setup Mode—See Appendix A. [SFR-092]

SFR:039

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. An integrated beverage blending system comprising:
  an ingredient module that has an ingredient; and
  a dispensing nozzle in communication with an ice maker that makes ice and said ingredient module, wherein said ice and said ingredient are dispensed into a beverage container via said dispensing nozzle,
  wherein said ingredient module comprises a refrigerated housing, an ingredient container disposed within said refrigerated housing, a tube disposed between said ingredient container and said dispensing nozzle, and a device that causes said ingredient to move from said ingredient container, through said tube and into said dispensing nozzle under pressure, and
  wherein said dispensing nozzle comprises an ice dispensing conduit on an interior surface thereof and a plurality of ingredient conduits formed within a wall of said dispensing nozzle, wherein each ingredient conduit is isolated from other ingredient conduits and said ice dispensing conduit, whereby product and/or flavor contamination is avoided,
  wherein said tube is connected to an end of one of said plurality of ingredient conduits on an exterior surface of said dispensing nozzle, and
  wherein said ingredient module is connected to a controller that controls dispense of said ingredient into said beverage container so that as a fluid level of said ingredient decreases within the ingredient container the controller adjusts delivery to compensate for a decrease in head pressure within the ingredient container.

2. The system of claim 1, wherein said dispensing nozzle is formed by injection molding of a plastic material to provide said ice dispensing conduit centrally disposed within said dispensing nozzle and said plurality of ingredient conduits, and
  wherein said tube is connected to an end of one of said plurality of ingredient conduits on an exterior surface of said dispensing nozzle.

3. The system of claim 2, wherein said ingredient module further comprises a holder for holding said ingredient container.

4. The system of claim 3, wherein said ingredient container is a flexible container, and said holder comprises a hanging rod connected to said ingredient container, for holding said ingredient container in a position that facilitates evacuation of said ingredient from said ingredient container.

5. The system of claim 4, wherein said position is a substantially vertical position.

6. The system of claim 3, wherein said tube has a first end and a second end, said first end being connected to said holder, and wherein said first tube comprises an aperture therein apart from said first end, to ensure substantial removal of ingredient from said container.

7. The system of claim 3, wherein said holder is pressurized by a second device, so that pressure is applied to the outside of said ingredient container.

8. The system of claim 2, further comprising a water reservoir in fluid communication with said tube.

9. The system of claim 8, wherein said water reservoir is in fluid communication with said tube through a manifold.

10. The system according to claim 2, further comprising an ice portion control module that is in communication with said ice maker.

11. The system according to claim 2, wherein said ingredient module dispenses at least one beverage flavor.

12. The system according to claim 2, further comprising a menu selection controller, said menu selection controller comprising a touch screen display allowing for the customizing of a beverage selection.

13. The system of claim 2, wherein said plurality of ingredient conduits are disposed around or proximate to said dispensing nozzle.

14. The system of claim 2, wherein said ingredient container is a plurality of ingredient containers, and said tube is a plurality of tubes, wherein each of said plurality of ingredient containers has a corresponding tube.

15. The system of claim 1, wherein said tube is connected to an end of one of said plurality of ingredient conduits on an exterior surface of said dispensing nozzle, said tube being connected to one of said plurality of ingredient conduits at said wall forming an outer perimeter of said ice dispensing conduit.

16. An integrated beverage blending system comprising:
  an ingredient module that has an ingredient; and
  a dispensing apparatus in communication with an ice maker that makes ice and said ingredient module, wherein said ice and said ingredient are dispensed into a beverage container via said dispensing apparatus,
  wherein said ingredient module comprises a refrigerated housing, an ingredient container disposed within said refrigerated housing, a tube disposed between said ingredient container and said dispensing nozzle, and a device that causes said ingredient to move from said ingredient container, through said tube and into said dispensing nozzle under pressure, and
  wherein said dispensing nozzle comprises an ice dispensing conduit on an interior surface thereof and a plurality of ingredient conduits formed within a wall of said dispensing nozzle, wherein each ingredient conduit is isolated from other ingredient conduits and said ice dispensing conduit, whereby product and/or flavor contamination is avoided,
  wherein said tube is connected to an end of one of said plurality of ingredient conduits on an exterior surface of said dispensing nozzle, and
  wherein air from said refrigerated housing is delivered to said dispensing nozzle to maintain a predetermined temperature at said dispensing nozzle.

* * * * *